US008108978B2

(12) United States Patent
Van Zile, III

(10) Patent No.: US 8,108,978 B2
(45) Date of Patent: Feb. 7, 2012

(54) APPARATUS FOR ACCURATELY POSITIONING AND SUPPORTING MODULAR TOOLING

(75) Inventor: Donald Van Zile, III, New Baltimore, MI (US)

(73) Assignee: Norgren Automation Solutions, Inc., Clinton Township, MI (US)

( * ) Notice: Subject to any disclaimer, the term of this patent is extended or adjusted under 35 U.S.C. 154(b) by 1660 days.

(21) Appl. No.: 11/403,277

(22) Filed: Apr. 13, 2006

(65) Prior Publication Data

US 2007/0006462 A1    Jan. 11, 2007

Related U.S. Application Data

(60) Provisional application No. 60/696,865, filed on Jul. 6, 2005.

(51) Int. Cl.
     *B25B 27/14* (2006.01)
(52) U.S. Cl. ...... 29/281.5; 29/281.1; 29/559; 29/525.11; 269/45; 403/64; 403/71
(58) Field of Classification Search ........ 29/462, 29/525.01, 525.11, 559, 281.1, 281.5, 283, 29/897.2, 795; 294/65; 269/45, 46; 403/64, 403/110, 118, 68, 69, 70, 71, 169, 198, 199, 403/240, 241, 341, 373, 380; 52/834, 835
See application file for complete search history.

(56) References Cited

U.S. PATENT DOCUMENTS

| | | | | |
|---|---|---|---|---|
| 792,436 A | * | 6/1905 | Meacham | 182/220 |
| 2,098,172 A | * | 11/1937 | Walker | 403/110 |
| 3,988,872 A | * | 11/1976 | Adamson et al. | 403/230 |
| 4,125,251 A | * | 11/1978 | Jamieson, Jr. | 269/45 |
| 4,129,328 A | | 12/1978 | Littell | |
| 4,256,300 A | * | 3/1981 | Boucher | 472/118 |
| 4,650,234 A | | 3/1987 | Blatt | 294/65 |
| 4,949,944 A | * | 8/1990 | Groff, Sr. | 269/45 |
| 5,135,276 A | | 8/1992 | Blatt et al. | 294/65 |
| 5,372,447 A | * | 12/1994 | Chung | 403/171 |
| 5,499,885 A | * | 3/1996 | Chapman | 403/380 |
| 5,660,442 A | * | 8/1997 | Tornero | 297/411.36 |
| 5,671,556 A | * | 9/1997 | Huntley | 40/200 |
| 5,785,447 A | * | 7/1998 | Fonti et al. | 403/49 |
| 5,926,882 A | * | 7/1999 | Veith et al. | 5/658 |
| 6,079,682 A | | 6/2000 | Olkkola | 248/278.1 |
| 6,095,713 A | | 8/2000 | Doyle et al. | 403/97 |
| 6,375,177 B1 | * | 4/2002 | Witte | 269/45 |
| 6,409,411 B1 | | 6/2002 | Crorey | 403/97 |
| 6,619,872 B2 | | 9/2003 | Crorey et al. | 403/97 |
| 6,974,276 B2 | * | 12/2005 | Kirchner et al. | 403/385 |
| 7,364,146 B2 | * | 4/2008 | Witte | 269/45 |
| 7,637,076 B2 | * | 12/2009 | Vaughn | 52/838 |

(Continued)

FOREIGN PATENT DOCUMENTS

DE     299 05 687 U1    7/1999

(Continued)

*Primary Examiner* — David Bryant
*Assistant Examiner* — Christopher Koehler
(74) *Attorney, Agent, or Firm* — Young Basile Hanlon & MacFarlane P.C.

(57) ABSTRACT

A tooling apparatus for positioning end effector tooling for engagement with a workpiece to facilitate the performance of work operations on the workpiece. The apparatus includes an elongated rectangular tubular backbone member, a plurality of tubular collars positioned over and secured to the backbone member at predetermined longitudinally spaced locations along the backbone member, and a plurality of support structures secured to a side of one or more of the collars utilizing a plurality of fasteners engaging apertures in the collars and aligned apertures in the underlying backbone member.

8 Claims, 8 Drawing Sheets

U.S. PATENT DOCUMENTS

| | | |
|---|---|---|
| 7,703,244 B2 * | 4/2010 | Suzuki et al. ............... 52/167.3 |
| 2004/0001739 A1 * | 1/2004 | Kirchner et al. ............. 403/382 |
| 2004/0101354 A1 * | 5/2004 | Nakahori et al. ............. 403/169 |

FOREIGN PATENT DOCUMENTS

| | | |
|---|---|---|
| DE | 200 17 129 U | 2/2001 |
| DE | 200 04 369 U1 | 7/2001 |
| DE | 100 17 897 A | 10/2001 |
| EP | 1 108 945 A | 6/2001 |
| EP | 1 123 783 A | 8/2001 |
| EP | 1 136 195 A | 9/2001 |
| EP | 1 617 087 A | 1/2006 |
| WO | 2004/103652 A | 12/2004 |

* cited by examiner

APPARATUS FOR ACCURATELY POSITIONING AND SUPPORTING MODULAR TOOLING

The present application claims priority to U.S. Provisional Application No. 60/696,865 filed Jul. 6, 2005. entitled APPARATUS FOR ACCURATELY POSITIONING AND SUPPORTING MODULAR TOOLING.

FIELD OF THE INVENTION

The present invention relates to an apparatus for accurately positioning and supporting modular tooling, and more particularly, an apparatus that provides a wide range of fine adjustment and rigid support for modular tooling to ensure accurate geometric positioning of a workpiece during machining and/or assembling of the workpiece.

BACKGROUND OF THE INVENTION

The assembling and/or welding of various workpieces is often a challenging task in the manufacturing industry. For example, in the automotive industry, sheet metal stampings must often be welded together in order to create a single assembled or preassembled part. Prior to welding the sheet metal stampings, the stampings must be positioned in a highly accurate and repetitive geometric position in order that the sheet metal stampings may be accurately welded into an assembled position. Failure to do so may lead to the improper sizing and positioning of the assembled workpiece relative to the remaining parts of the automobile. The positioning of the sheet metal stampings prior to welding is often referred to as the geometric positioning of the workpiece.

In order to maintain the geometric positioning of the workpiece, previous designs have utilized heavy, rigid, structural members that are supported and moved by manipulators, such as robotic arms. These structural members are typically fabricated from heavy-duty steel so as to ensure the integrity and positioning of the end effector tooling that is mounted thereon. Such end effector tooling may include various power clamps, power grippers, and/or pin locators to locate and secure the workpiece in a predetermined geometric position. The adjustability and/or flexibility of the positioning and movement of the end effector tooling has been limited in such previous designs, as the previous designs typically concentrate on the rigidity and accuracy of the end effector tooling. This is to ensure that if the end effector tooling were to come into contact with something other than the workpiece, the end effector tooling will not be compromised, but rather, the end effector tooling will maintain the geometric positioning necessary to weld and assemble accurate workpieces.

The disadvantage to such previous designs is that they are typically heavy and non-flexible in design. Thus, the manipulator or robotic arm must be large and powerful enough to support and move such heavy tooling. In addition, the lack of flexibility does not allow for a high degree of adjustability to the end effector tooling such that the end effector tooling may be adjusted for a variety of different workpieces. The inability of such designs to adapt to various workpiece designs requires that the end effector tooling be dedicated to the specific configuration of one particular workpiece. This requires that a multitude of tooling be purchased and provided thereby creating an undesirable inefficiency in the industry.

It would be desirable to provide lightweight, flexible tooling that provided for the accurate positioning and support of end effector tooling to ensure geometric positioning of a variety of workpieces during the machining and/or assembling of the workpiece.

SUMMARY OF THE INVENTION

The present invention relates to an apparatus for accurately positioning, adjusting, and supporting end effector tooling to ensure the geometric positioning of a workpiece during the machining and/or assembling of the workpiece. The apparatus provides a rigid support member connectable to a manipulator, such as a robotic arm. A plurality of coupling members are connected to the rigid support member in predetermined positions. At lease one support member is adjustably connected to at least one of the coupling members wherein the support members are adaptable to receive the end effector tooling in a predetermined geometric position.

According to an important feature of the invention, the apparatus includes an elongated tubular backbone member of polygonal cross-section, a plurality of annular collars having a polygonal cross-section corresponding to the polygonal cross-section of the backbone member positioned over and secured to the backbone member at spaced locations along the backbone member, a plurality of support structures secured to a side of one or more collars, and a plurality of fasteners adapted to secure the support structures to the collars.

According to a further feature of the invention, the fasteners engage apertures in the collars and aligned apertures in the underlying backbone member.

According to a further feature of the invention, the apertures in the collars and the underlying backbone member comprise threaded apertures for receipt of threaded fasteners and unthreaded apertures for receipt of dowel pins.

According to a further feature of the invention, the apertures are aligned in rows with each row including a pair of outboard threaded apertures for receipt of outboard threaded fasteners and a central unthreaded aperture for receipt of a central dowel pin.

According to a further feature of the invention, the support structure defines an outwardly opening socket.

According to a further feature of the invention, the apparatus further includes a tubular boom rod telescopically received at its inboard end in the outwardly opening socket.

According to a further feature of the invention, the apparatus further includes a coupling including a socket portion telescopically receiving the outboard end of the boom rod and a mounting surface mounting a respective end effector tool.

According to a further feature of the invention, the coupling includes a base member defining the socket portion and a mounting plate defining the mounting surface.

According to a further feature of the invention, the base member and the mounting plate are adjustably interconnected.

According to a further feature of the invention, the adjustable interconnection between the base member and the mounting plate comprises a series of parallel grooves on one of the base member and the mounting plate and a series of coacting parallel ribs on the other of the base member and the mounting plate.

According to a further feature of the invention, the support structures include a support plate secured to one or more collars and a socket member secured to the support plate.

The invention also provides a methodology for forming a tooling apparatus for positioning end effector tooling.

According to the invention methodology, a tubular backbone member of polygonal cross sectional configuration is provided; a plurality of collars are positioned over the backbone member at predetermined longitudinally spaced locations; the collars are secured to the backbone member; the collars and backbone member are machined to provide a plurality of aligned apertures in the collars and in the underlying backbone member; a plurality of support structures are provided for supporting the end effector tooling; and the support structures are secured to the collars utilizing fasteners engaging the aligned apertures in the collars and in the underlying backbone member.

According to a further feature of the invention methodology, at least certain of the aligned apertures are threaded and the fasteners comprise threaded fasteners.

According to a further feature of the invention methodology, at least certain of the aligned apertures are unthreaded and the fasteners comprise dowel pins.

According to a further feature of the invention methodology, each support structure defines an outwardly opening socket and the method includes the further steps of positioning the inboard end of a boom rod in each socket, mounting a coupling member on the outboard end of each boom rod, and mounting an end effector tool on the coupling member.

BRIEF DESCRIPTION OF THE DRAWINGS

The description herein makes reference to the accompanying drawings wherein like reference numerals refer to like parts throughout several view and wherein.

DESCRIPTION OF THE PREFERRED EMBODIMENT

Figure 1:
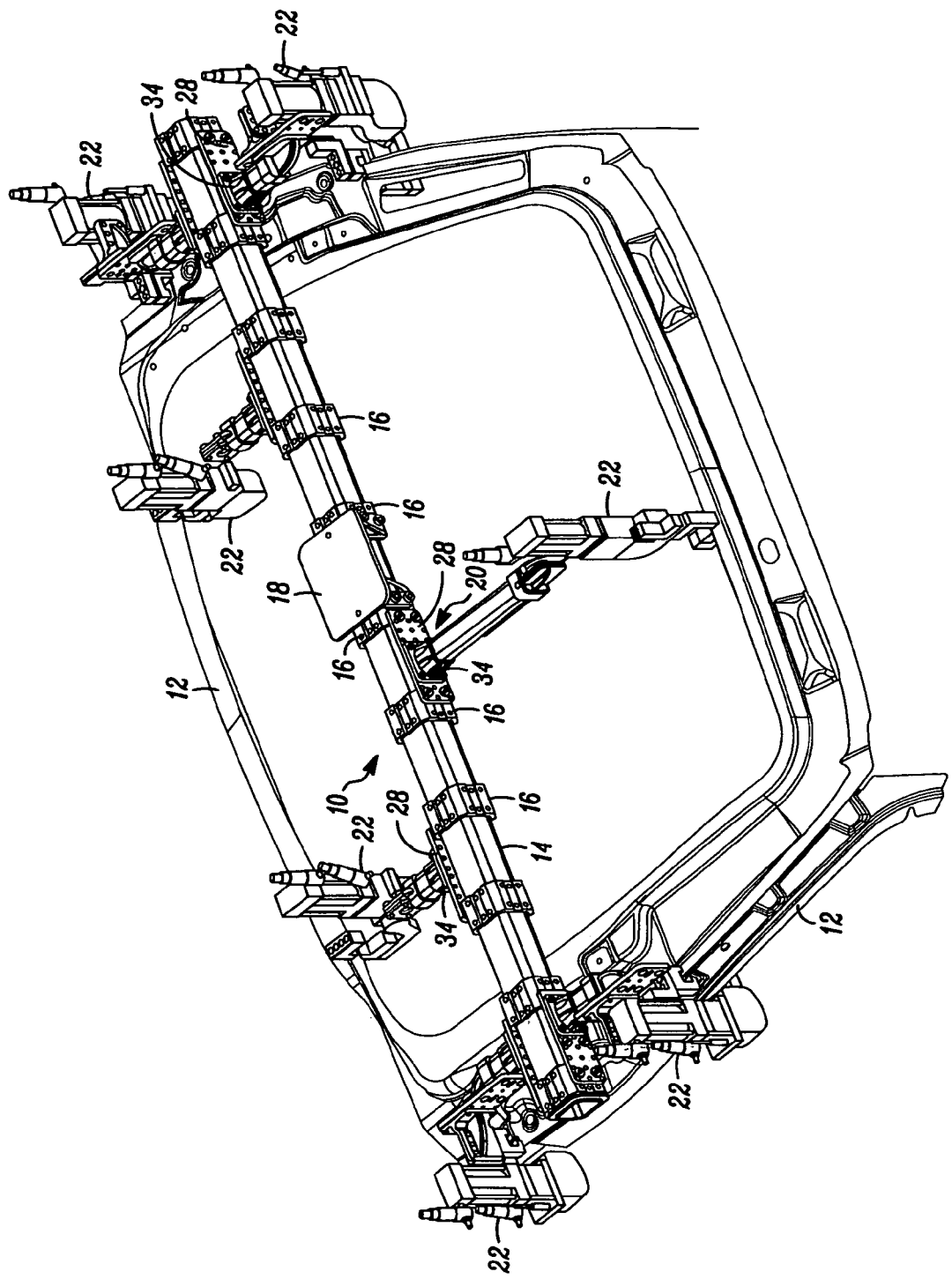
FIG. 1 is a perspective view of the apparatus of the present invention being utilized to clamp and position two sheet metal workpieces.

Referring to the drawings, the present invention will now be described in detail with reference to the disclosed embodiment.

FIGS. 1-8 illustrate an apparatus 10 for accurately positioning and supporting a workpiece 12 or workpieces 12, such as stamped sheet metal parts, in a predetermined geometric position so that certain machining and assembling operations may be performed on the workpiece 12.

The apparatus 10 includes a rigid support member or backbone member 14 that is connectable to a manipulator, such as a robotic arm (not shown). The backbone member 14 has a plurality of annular coupling or collar members 16 mounted thereon in predetermined longitudinally spaced positions. A mounting plate 18 may be connected to a pair of collar members 16, whereby the manipulator or robotic arm is connected via the mounting plate 18 to the backbone member 14. A plurality of support structures 20 are connected to at least one of the collar members 16 in predetermined positions. The support structures 20 support end effector tools 22, such as power clamps, power grippers, and/or locator pins. The apparatus 10 provides accurate positioning of the end effector tools 22 so as to accurately and repeatably position the workpieces 12 in a predetermined geometric position so that a particular machining or assembling operation, such as welding, may be performed on the workpieces 12. Such geometric positioning may hold tolerances up to + or −0.25 mm.

In order to provide the apparatus 10 with the appropriate rigidity and support, the backbone member 14 is fabricated from a substantially rectangular, hollow tubular structure having rounded corners thereon. The backbone member 14 is fabricated from a lightweight, high-strength rigid material, such as carbon fiber, steel, castings, aluminum, or other lightweight, high-strength, rigid materials. The backbone member 14 is fabricated in a high-precision manner such that the backbone member 14 may maintain a high degree of accuracy.

The collar members 16 are mounted on the outside surface of the backbone member 14. The collar members 16 are substantially rectangular and hollow so as to receive the backbone member 14. The collar members 16 are also fabricated from a lightweight, high-strength material, similar to that provided for the backbone member 14. The collar members 16 are fixedly secured to the backbone member 14 by bonding or welding. However, it is anticipated that other securing means may be utilized such as expanding the backbone member 14 onto the collar members 16 when the backbone member is fabricated from a carbon fiber material.

Following securement of the collar members 16 on the backbone member 14 in predetermined longitudinally spaced positions, six apertures, formed as two parallel rows, are machined in each of the four sides of each collar member 16 and in the underlying backbone member 14 for receiving dowel rods 33 and threaded fasteners 32 from the support structures 20. The central apertures 24a on each row on each side of the collar member 16, as well as the aligned central apertures 14a in backbone member 14, are unthreaded and receive a dowel rod 33, and the outboard apertures 24b in each row on each side of the collar member 16, as well as the aligned outboard apertures 14b in backbone member 14, are threaded for receiving threaded fasteners 32. Each of the four sides of the collar members 16 may also have a recessed portion 26 for reducing the amount of material and weight associated with the collar members 16. Again, the collar members 16 are fabricated in a high-precision manner so as to maintain a high degree of accuracy when mounting the end effector tooling 22 thereon.

Figure 4:
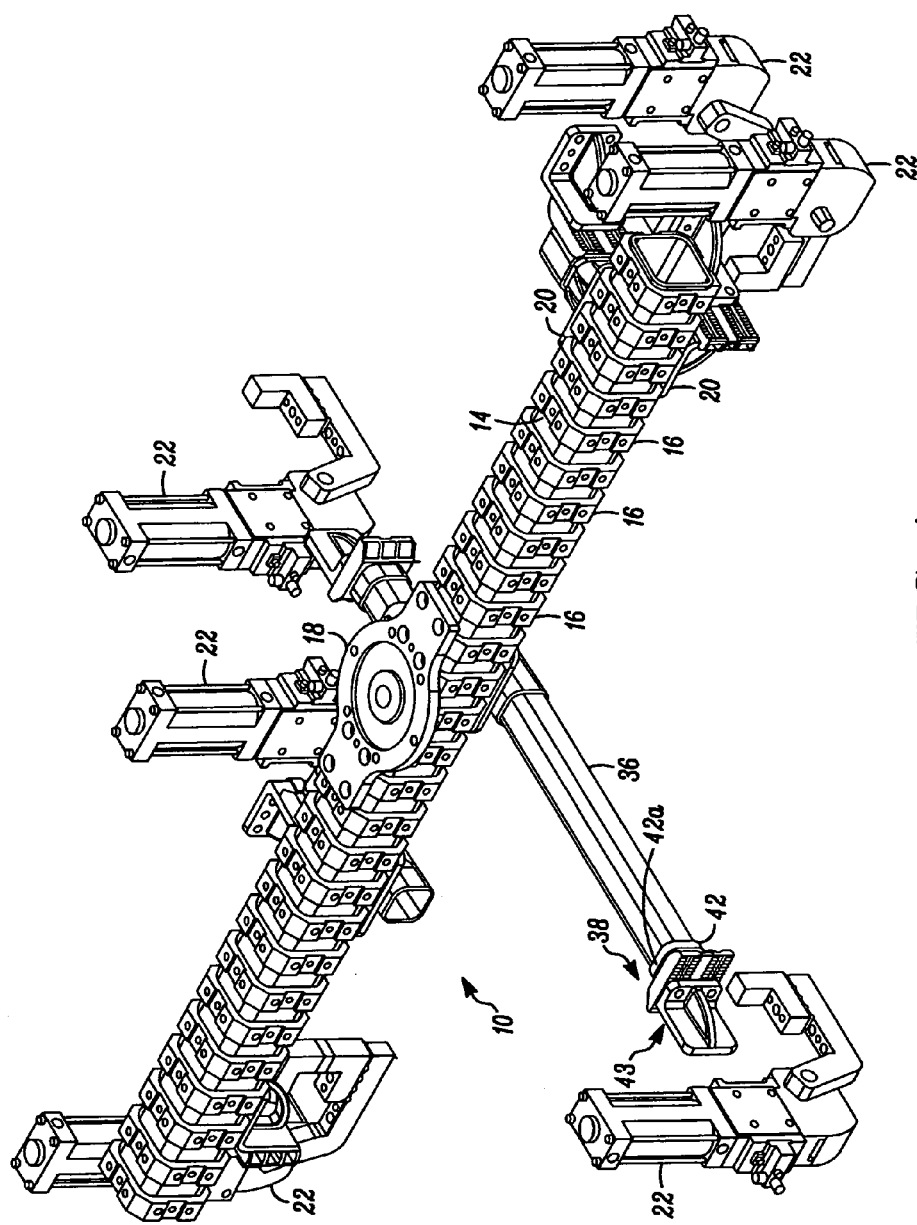
FIG. 4 is a perspective view of the apparatus of the present invention in another configuration.
Figure 5:
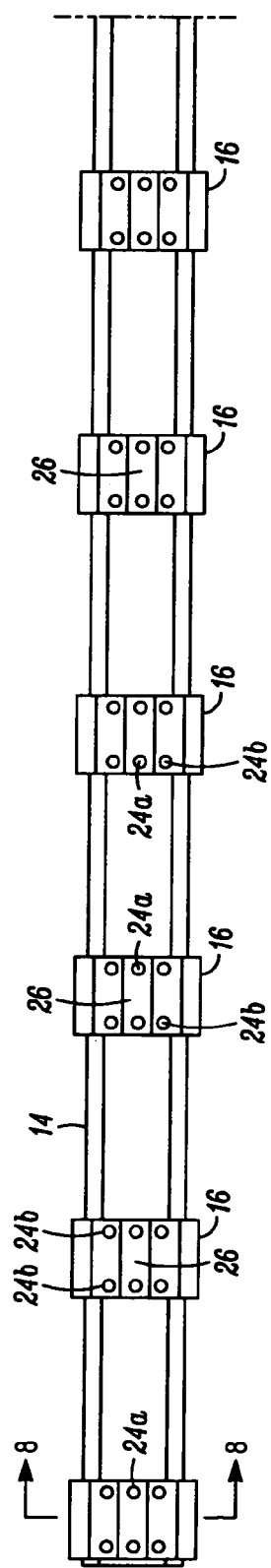
FIG. 5 is a front plan view of a rigid support member of the apparatus of the present invention.
Figure 7:
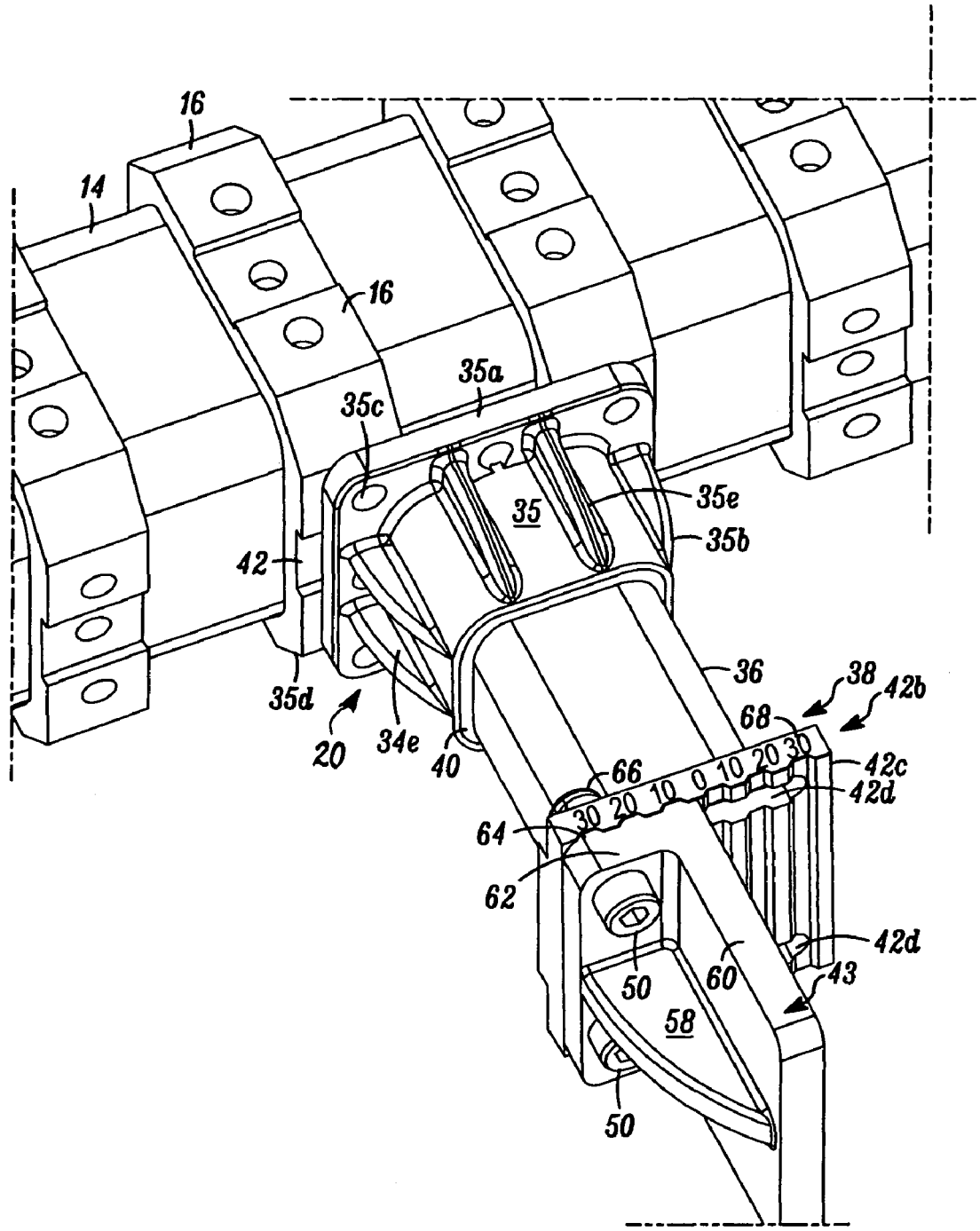
FIG. 7 is a perspective view showing an adjustable support member of the apparatus of the present invention.
Figure 8:
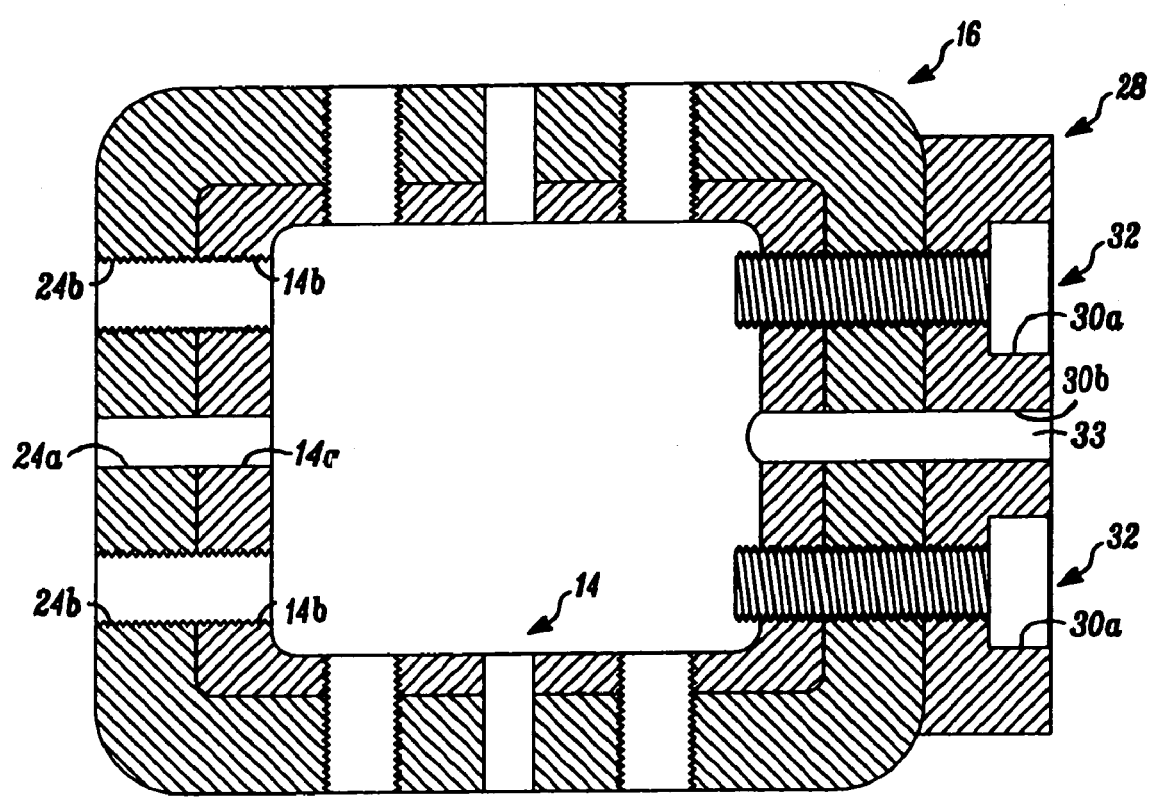
FIG. 8 is a cross-sectional view taken on line 8-8 of FIG. 5.

Alternatively, and as seen in FIGS. 4 and 7, each collar member 16 may have a single row of apertures 24a, 24b on each side thereof for aligned coaction with a single row of apertures in the underlying backbone member 14.

Figure 6:
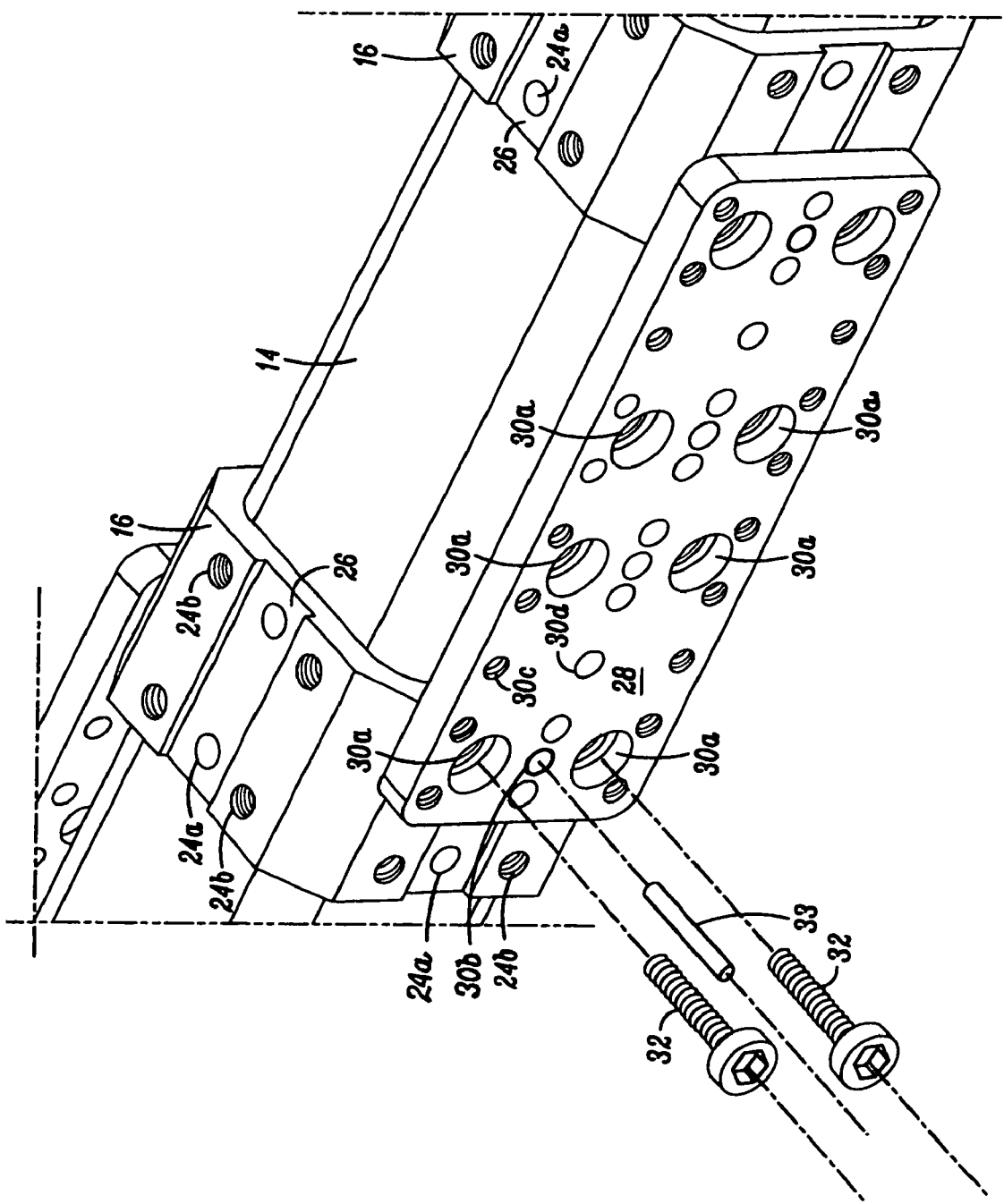
FIG. 6 is a perspective view showing the rigid support member, the coupling members, and the support member of the apparatus of the present invention.

Various support structures 20 may be utilized to connect the end effector tooling 22 to the collar members 16. In one support structure embodiment, seen in FIGS. 1, 3 and 6, the support structure includes a support plate 28 connected to and extending between a pair of collar members 16, as best seen in FIG. 6. The support plate 28 may be connected at each end to any of the four sides of the collar members 16. The support plate 28 has a substantially rectangular, plate-like configuration with rounded corners. A plurality of unthreaded outboard counterbore apertures 30a extend through the support plate 28 for receiving threaded fasteners 32 for engagement with threaded apertures 24b in a side face of the collar members and aligned threaded apertures 14b in the backbone member, and a plurality of unthreaded central constant diameter apertures 30b extend though the support plate for receiving locating dowel rods 33 for receipt in unthreaded central apertures 24a in a side face of the collar members and aligned unthreaded central apertures 14a in the backbone member. The threaded fasteners 32 serve to rigidly mount the support plate 28 on the collar members 16 and the dowel rods 33 provide a high degree of locational accuracy in the positioning of the plate on the collar members. The support plate 28 further includes a plurality of spaced rows of apertures with each row including a pair of threaded outboard apertures 30c and unthreaded central apertures 30d. The support plate 28 is manufactured in a highly precise manner and may be fabricated from a low-weight, high-strength rigid material similar to that provided for the rigid support member 14. The support plate 28 allows for adjustment of the end effector tooling 22 along a longitudinal axis of the backbone member 14.

Figure 3:
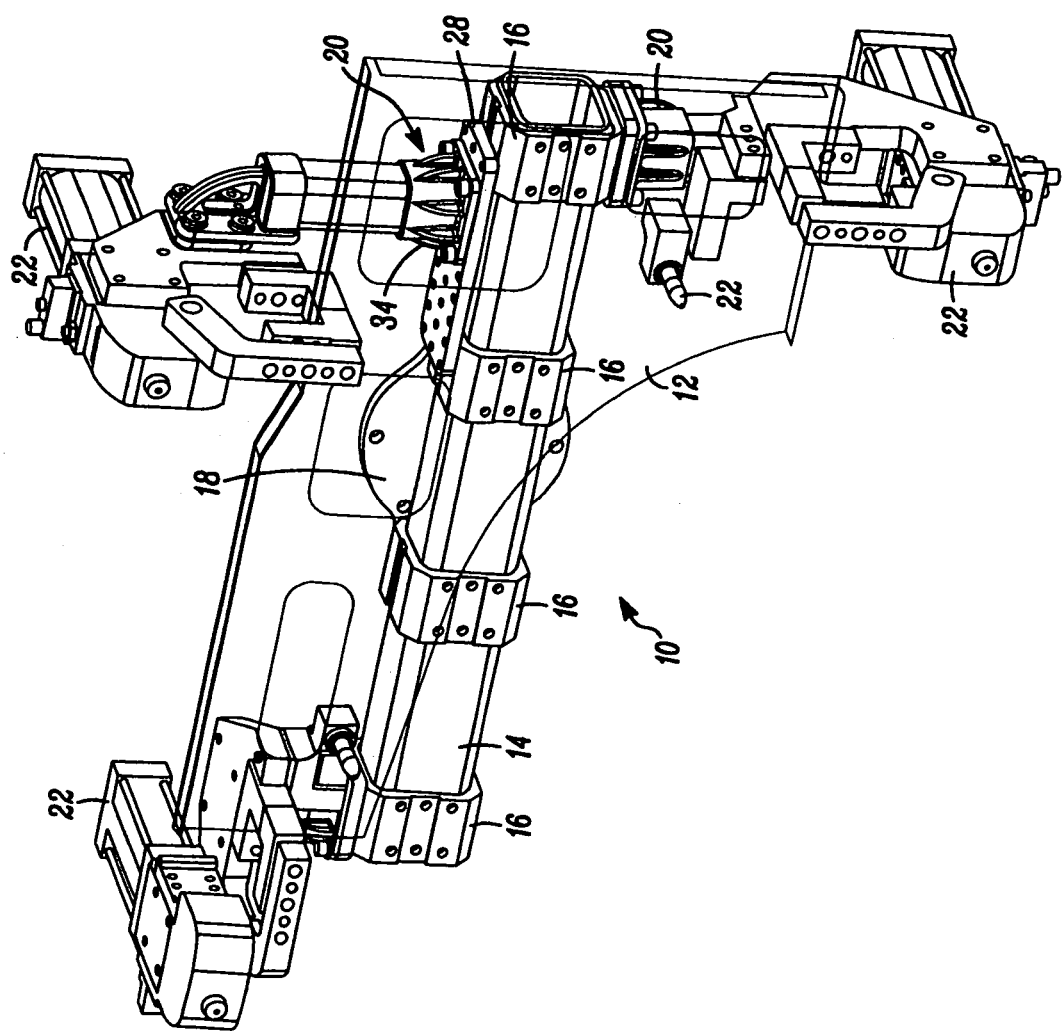
FIG. 3 is a perspective view showing the apparatus of the present invention locating and clamping two sheet metal pieces.

The support structure 20 of the embodiment of FIGS. 1, 3 and 6 also includes a socket member 34 that is connected directly to the support plate 28 by the use of threaded fasteners 32 engaging threaded outboard apertures 30c and locating dowel rods 33 engaging unthreaded central apertures 30d.

Figure 2:
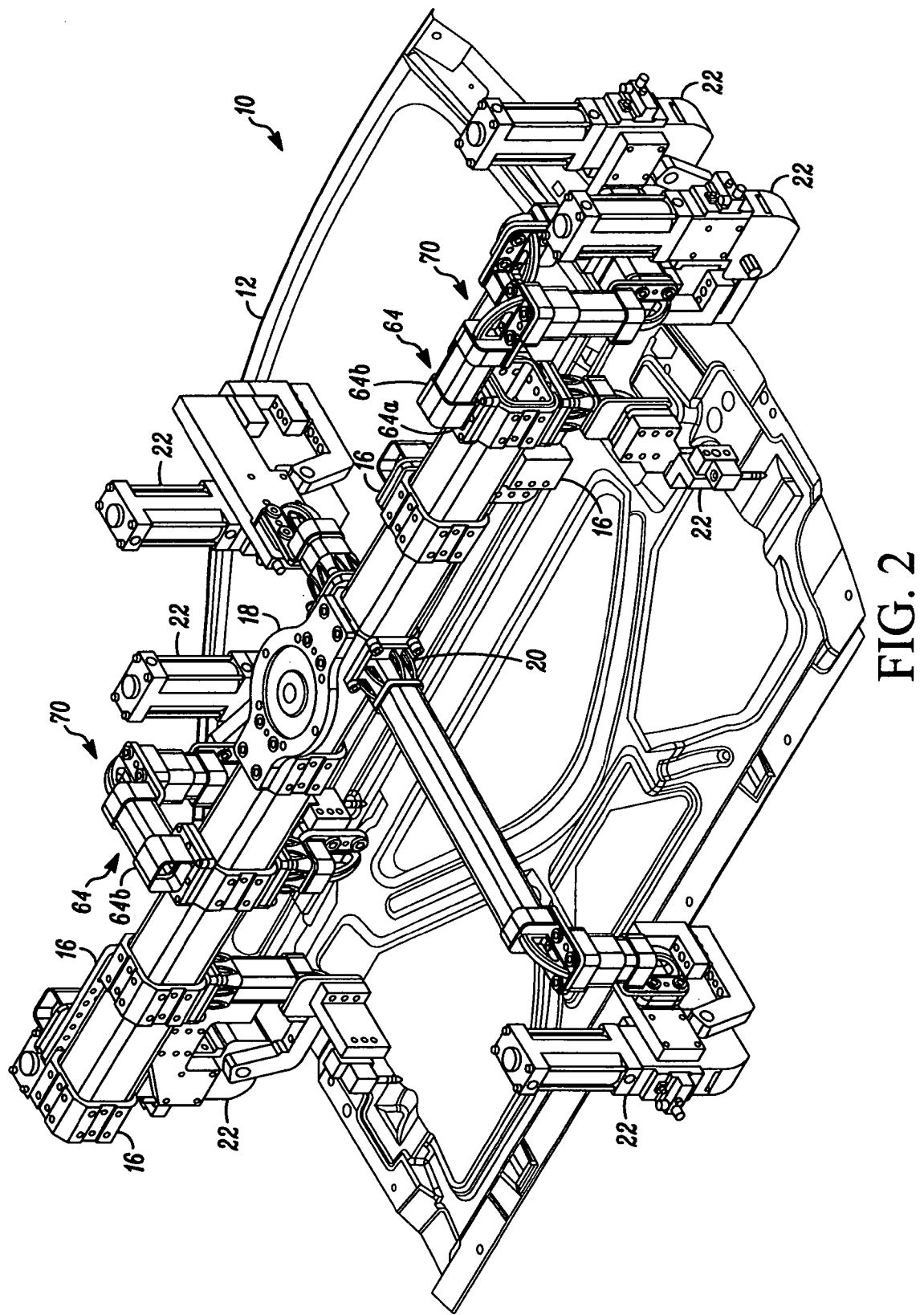
FIG. 2 is a perspective view of the apparatus of the present invention clamping and positioning a sheet metal workpiece.

In an alternate embodiment of the support structure 20, as seen in FIGS. 2 and 7, the support structure 20 may comprise a unitary member 35 including a rectangular base portion 35a and a rectangular socket portion 35b. The base portion 35a includes outboard apertures 35c extending therethrough for receiving threaded fasteners 32 for threaded engagement with outboard collar apertures 24b and outboard backbone apertures 14b and central constant diameter apertures 35d for receiving dowel rods 33 for receipt in unthreaded central collar apertures 24a and unthreaded central backbone apertures 14a. Rib portions 35e extend integrally from the base portion 35a and the socket portion 35b to provide added support to the socket portion 35b. The unitary member 35 is manufactured in a highly precise manner and may be fabricated from a low weight, high strength rigid material similar to that provided for the rigid support member 14.

In a further alternate embodiment of the support structure 20, seen at 64 in FIG. 2, the support structure includes a base plate portion 64a secured to a side face of a collar and a U-shaped tubular socket portion 64b.

The positioning apparatus of the invention further includes a plurality of boom rods 36. Each boom rod 36 is substantially rectangular and hollow and includes rounded corners. Each boom rod 36 is telescopically received at its inboard end in a socket column member 34, in a socket portion 35b of a unitary member 35, or in the "U" shaped socket portion 64b of a support structure 64, and may be fixedly secured to the member 34, socket portion 35b, or socket portion 64b by bonding or welding. Each boom rod 36 is also manufactured in a highly precise manner and fabricated from a light weight, high strength rigid material as previously described for the rigid support member 14.

As best seen in FIGS. 4 and 7, each effector tooling 22 is supported on the outboard end of a boom rod 36 through the use of an adjustable coupling. Several variations of adjustable couplings are illustrated. One form of adjustable coupling is seen at 38 in FIGS. 4 and 7 and includes a base member 42 and an adjustable mounting plate 43.

Base member 42 includes a substantially rectangular tubular portion 42a for telescopically receiving the outboard end of a boom rod 36 and a base portion 42b which is integral with the tubular portion 42a. The base portion 42b provides a substantially flat mounting surface having contoured parallel grooves 42c formed therein. A pair of spaced substantially parallel slots 42d extend through the base portion 42b of the base member 42 at right angles to the grooves 42c.

Each adjustable mounting plate 43 is coupled to the base portion 42b of a base member 42. The adjustable mounting plate 43 has an L-shaped configuration including a webbed portion 58 extending integrally between a long leg portion 60 and a short leg portion 62. The short leg portion 62 has a contoured ribbed surface 64 formed on the bottom thereof for matingly engaging the grooves 42c on the base portion 42b of the base member 42 whereby to adjustably mount the mounting plate on the base member. A pair of apertures extend through the short leg portion 62 of the mounting plate 43 and align with the slots 42d in the base portion 42b of the base member 42. A pair of conventional fasteners 50 extend through the apertures in the short leg portion 62 and through the slots 42d, and a nut 66 is provided on the threaded end of the fasteners 50 to tighten the mounting plate 43 on the base member 42 in any desired position of lateral adjustment. Indicia 68 are provided on an edge of the base portion 42b of the base member 42 so as to indicate the position of the adjustable mounting plate 43 relative to the base member. Each adjustable coupling 38 is manufactured in a highly precise manner and fabricated from similar materials as the rigid support member 14.

Each end effector tooling 22 is mounted on an adjustable mounting plate 43 utilizing apertures extending through the adjustable mounting plate which correspondingly align with apertures provided in the end effector tooling 22. Conventional fasteners extend through the apertures in the adjustable mounting plate 43 and into the apertures provided in the end effector tooling 22 to secure the end effector tooling 22 to the adjustable mounting plate 43. As previously noted, various end effector tooling 22 may be utilized, such as power grippers, power clamps, locator pins, etc.

In operation, the apparatus 10 is typically set up prior to connecting the apparatus 10 to a manipulator or a robotic arm. The end effector tooling 22 is adjusted with respect to the apparatus 10 so as to provide proper geometric positioning of the workpiece 12. The end effector tooling 22 may be adjusted by moving and/or adjusting the collar members 16 with respect to the backbone member 14 and by adjusting support structures 20 with respect to collar members 16. The length of the boom rods 36 may also be adjusted to provide further adjustment to the end effector tooling 22. The adjustable mounting plate 43 also provides varied adjustment of the end effector tooling 22. Further, as seen at 70 in FIG. 2, combinations of boom rods and couplings may be utilized to allow the mounting structure for the end effector tooling to include right angles or elbows.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is performed under the law.

What is claimed is:

1. A tooling apparatus for positioning end effector tooling for engagement with a workpiece to facilitate the performance of work operations on the workpiece, the apparatus comprising:

an elongated tubular backbone member of polygonal cross-section;

a plurality of annular collars having a polygonal cross-sectional corresponding to the polygonal cross-section of the backbone member positioned over and secured to the backbone member at predetermined spaced locations along the backbone member;

a support structure sized to be secured to a side of one or more collars, wherein the support structure defines an outwardly opening socket;

a tubular boom rod telescopically received at its inboard end in the outwardly opening socket;

a coupling including a socket portion telescopically receiving an outboard end of the tubular boom rod and a mounting surface for mounting a respective end effector tool, wherein the coupling includes a base member defining the socket portion and a mounting plate defining the mounting surface, and the base member and the mounting plate are adjustably interconnected; and a plurality of fasteners adapted to secure the support structure to the collars, wherein the fasteners engage apertures in the collars and aligned apertures in the underlying backbone member.

2. An apparatus according to claim 1, wherein the aligned apertures in the collars and in the underlying backbone member comprise aligned threaded apertures for receipt of threaded fasteners and aligned unthreaded apertures for receipt of dowel pins.

3. An apparatus according to claim 1, wherein the aligned apertures are arranged in rows with each row including a pair of outboard threaded apertures for receipt of outboard threaded fasteners and a central unthreaded aperture for receipt of a dowel pin.

4. An apparatus according to claim 1, wherein the adjustable interconnection between the base member and the mounting plate comprises a series of parallel grooves on one of the base member and the mounting plate and a series of coacting parallel ribs on the other of the base member and the mounting plate.

5. An apparatus according to claim 1, wherein the support structure includes a support plate secured to one or more collars and a socket member secured to the support plate.

6. An apparatus according to claim 1, wherein the support structure comprises a unitary member including a base portion secured to one or more collars and a socket portion extending outwardly from the base portion.

7. A tooling apparatus for positioning end effector tooling for engagement with a workpiece to facilitate the performance of work operations on the workpiece, the apparatus comprising:

an elongated tubular backbone member of polygonal cross-section;

a plurality of annular collars having a polygonal cross-sectional corresponding to the polygonal cross-section of the backbone member positioned over and secured to the backbone member at predetermined spaced locations along the backbone member;

a support structure sized to be secured to a side of one or more collars;

a boom rod that is supported by the support structure;

a coupling disposed at an outboard end of the boom rod, the coupling having a base member that is connected to the boom rod and a mounting plate for mounting a respective end effector tool, wherein the base member and the mounting plate are adjustably interconnected; and a plurality of threaded fasteners adapted to secure the support structure to the collars.

8. An apparatus according to claim 7, wherein the adjustable interconnection between the base member and the mounting plate comprises a series of parallel grooves on one of the base member and the mounting plate and a series of coacting parallel ribs on the other of the base member and the mounting plate.

* * * * *

UNITED STATES PATENT AND TRADEMARK OFFICE
CERTIFICATE OF CORRECTION

| | |
|---|---|
| PATENT NO. | : 8,108,978 B2 |
| APPLICATION NO. | : 11/403277 |
| DATED | : February 7, 2012 |
| INVENTOR(S) | : Van Zile, III |

Page 1 of 1

It is certified that error appears in the above-identified patent and that said Letters Patent is hereby corrected as shown below:

1. In Column 1, line 6, please delete "2005. entitled" and insert --2005 entitled--;

2. In Column 5, line 6, please delete "Base member" and insert --The base member--;

3. In Column 6, lines 65-66, please delete "cross-sectional" and insert --cross-section--; and 4. In Column 8, lines 14-15, please delete "cross-sectional" and insert --cross-section--.

Signed and Sealed this
First Day of May, 2012

David J. Kappos
*Director of the United States Patent and Trademark Office*